Patented Oct. 4, 1932

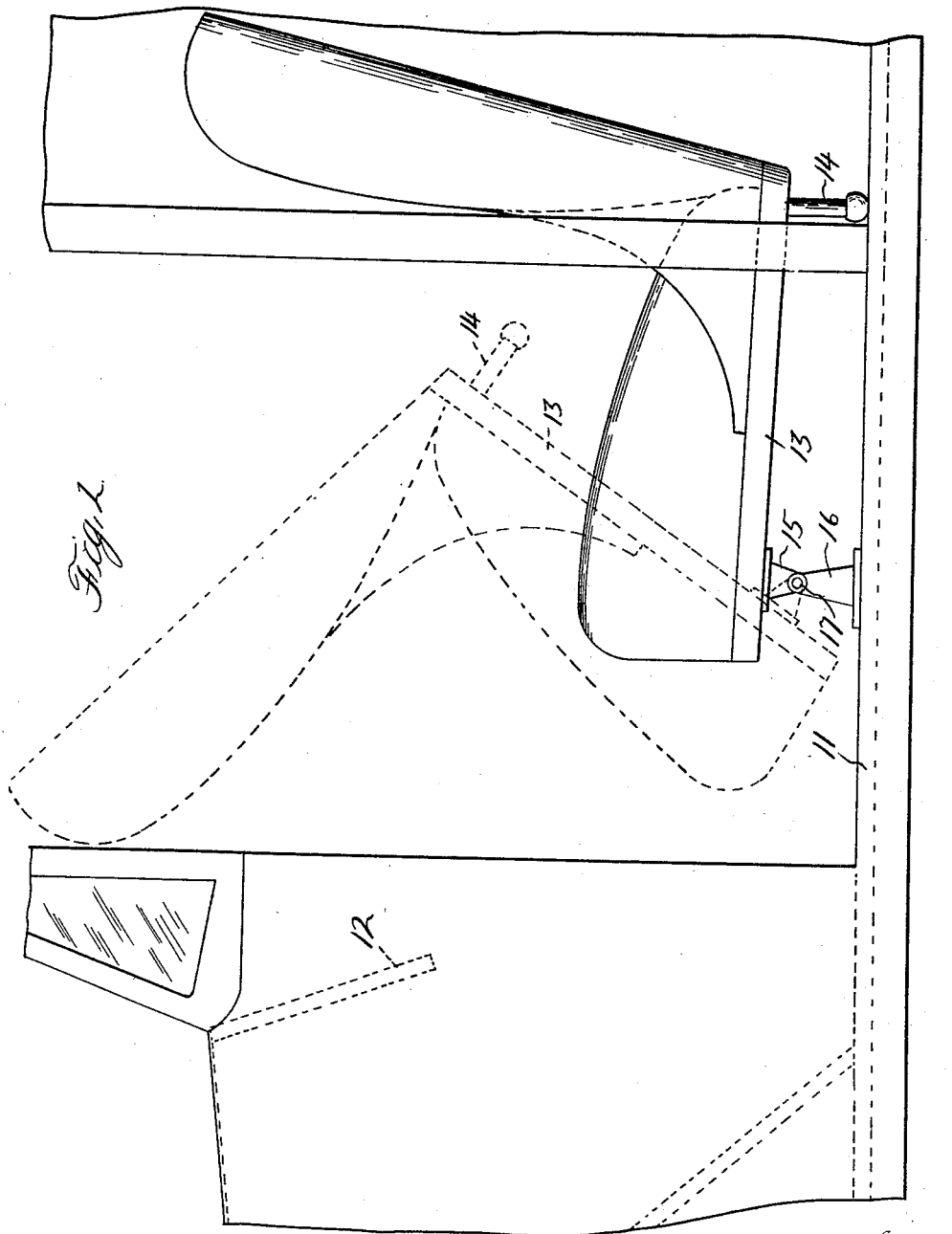

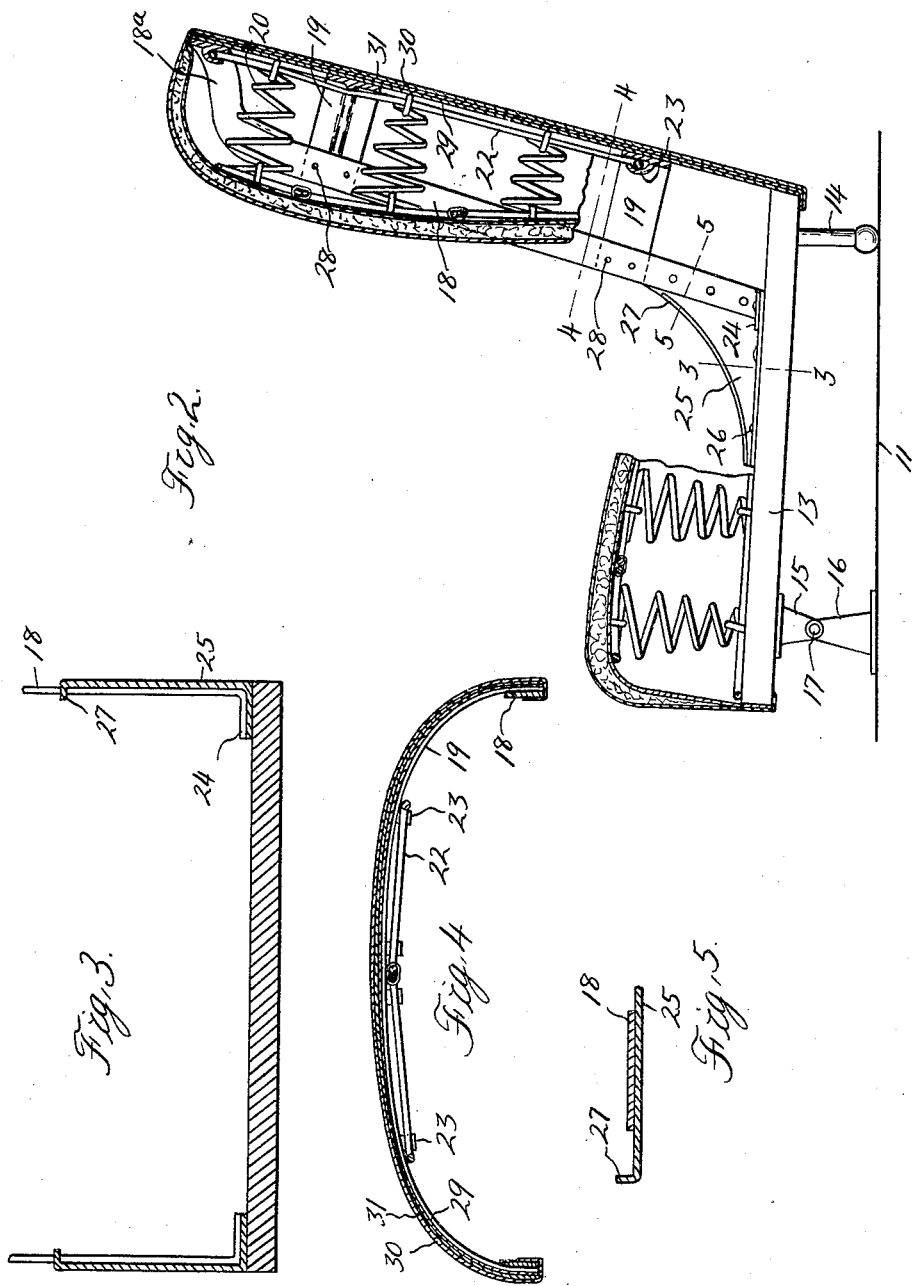

1,880,497

UNITED STATES PATENT OFFICE

WALTER S. SAUNDERS AND ROBERT MARTINDELL, OF PONTIAC, MICHIGAN, ASSIGNORS TO AMERICAN FORGING & SOCKET CO., OF PONTIAC, MICHIGAN

SEAT BACK CONSTRUCTION

Application filed July 15, 1927. Serial No. 206,012.

This invention relates to vehicle seat frames and more particularly to the frames of vehicle seats which are mounted to tilt forwardly for the convenience of persons entering or leaving a vehicle.

It is an object of the invention to form the back frame of a tilting vehicle seat of several metal straps connected and fashioned in a manner to secure a maximum of strength with a minimum of weight and material.

Another object is to secure to such a frame a light backing sheet of cardboard, or the like, sufficiently stiff to adequately support an outer layer of fabric.

Still another object is to securely mount such a frame upon a seat base by means of a pair of bracket members formed preferably of sheet metal, and arranged to brace the frame against strains in practically all directions.

These and various other objects the invention attains by the use of the construction hereinafter described and illustrated in the accompanying drawings, wherein:—

Figure 1 is a view in side elevation of a seat embodying our improved construction showing a fragmentary portion of a vehicle in which said seat is installed.

Figure 2 is a vertical sectional view of the seat, with portions broken away.

Figure 3 is a cross sectional view taken upon the line 3—3 of Figure 2.

Figure 4 is a cross sectional view of the seat back taken upon the line 4—4 of Figure 2, and Figure 5 is a detail section taken on line 5—5 of Figure 2.

In these views the reference character 11 designates the floor of a vehicle, 12 the dash thereof, and 13 the base of a seat, which base may be formed of wood or other suitable material. The rear portion of the seat is adapted to be upheld by a post or the like 14, which as illustrated is attached to the base 13, but which may if desired be attached to the floor. The front portion of the seat is jointly supported by a pair, or pairs of brackets 15 and 16, the former depending from the base 13 and the latter rising from the floor 11, said brackets being pivotally connected as indicated at 17 to adapt the seat to be tilted from its position of use shown in full lines in Figure 1 to the forward position of engagement with the dash 12 shown in dotted lines in said figure.

The frame of the back of said seat comprises an arched element 18 formed of strap sheet metal, the top portion 18a of which is bowed rearwardly to accommodate the upholstering of the seat back, and further comprises a pair of brace members 19 likewise formed of strap sheet metal extending between the uprights of the element 18 and having their ends riveted or otherwise rigidly secured to said uprights. Said members 19 are preferably bowed similarly to the portion 18a of the member 18.

The upholstery of the seat back comprises a set of coiled springs 20 and a suitably padded cover member for said springs. Said springs are connected to a suitable frame 22 which ordinarily is formed of wire, and the lower brace member 19 has a plurality of upstanding tongues 23 pressed forwardly therefrom, which are engaged by the frame 22 to support the upholstery of the seat back. The lower extremities of the arched frame element 18 are bent as indicated at 24 to form feet which rest upon and are suitably secured to the seat base 13 and the connection between the back frame of the seat and said seat base is strongly reinforced by a pair of approximately triangular sheet metal brackets 25 secured to the lower portions of the member 18 and projecting forwardly therefrom, and marginally flanged at their lower edges for engagement by nails 26, or the like, securing said brackets to the base 13. Preferably the inclined upper edges of said brackets will also be marginally flanged as indicated at 27. The brackets as thus formed and arranged will reinforce the seat-back against strains and stresses imposed from practically all directions.

To the rear face of the back frame 18, 19 there is secured by rivets 28 or the like, a sheet 29 of stiff cardboard or similar material which forms a backing for one or more layers of fabric covering the rear face of the seat back. Thus in the illustrated construction, a layer of burlap 30 is applied against the cardboard backing 29 and a finishing layer 31 of velour or the like, covers the burlap.

The described seat structure yields the advantages that the back frame 18, 19 is quite light and comparatively inexpensive although adequately strong to withstand all ordinary stresses. The strength of the seat frame is largely derived from the strongly reinforced connection established through the brackets 25 between said frame and the base 13. The construction is stronger and less expensive than are the tilting seats now in use, in one of which an integral metallic back frame is secured upon a suitable base, and in another of which a tilting back is pivoted to the base.

It is found that the strap metal frame 18, 19 in conjunction with a cardboard backing sheet 29 attached thereto adequately supports the facing layer of velour or the like.

While it will be apparent that the illustrated embodiments of our invention herein disclosed are well calculated to adequately fulfill the objects and advantages primarily stated, it is to be understood that the invention is susceptible to variation, modification and change within the spirit and scope of the subjoined claims.

What we claim is:—

1. The combination with the back frame of a seat formed of an arched strap metal support having substantially vertical side portions, strap metal brace members connecting the side portions of said support, one of said brace members having a plurality of hooked tongues struck forwardly therefrom, of an upholstering member for said seat back having a portion engaged behind said tongues to be supported thereby upon one side of the frame, the tongues being bent down upon the engaged portion of the upholstery member, a stiffening cardboard support carried by and covering the other side of said frame, and a covering of limp material enclosing both sides of said frame and the cardboard, being supported by said cardboard on its side of the frame.

2. A seat back comprising an arched sheet metal strip having parallel side portions the width of which extends from front to back and the top portion of which extends approximately vertically, said top portion being rearwardly bowed, integral struck-up hooks carried by said bowed portion, an upholstery frame supported by said hooks on one side of said seat back, the hooks being bent down upon the upholstery frame, a forming sheet of relatively stiff material of low tensile strength, secured at spaced points to and supported by the other side of said seat back, and covering material arranged to lie flat against the outer faces of both the side and top portions of said strip to cover both sides of said seat back, lying flat against said forming sheet.

In witness whereof we hereunto set our hands.

WALTER S. SAUNDERS.
ROBERT MARTINDELL.